United States Patent
Chang

(10) Patent No.: US 7,800,584 B2
(45) Date of Patent: Sep. 21, 2010

(54) WIRELESS INPUT MODULE WITH WIRELESS INPUT DEVICE AND RECEIVER

(75) Inventor: Hun-Te Chang, Zhongli (TW)

(73) Assignee: Darfon Electronics Corporation, Taoyuan (TW)

( * ) Notice: Subject to any disclaimer, the term of this patent is extended or adjusted under 35 U.S.C. 154(b) by 795 days.

(21) Appl. No.: 11/802,017

(22) Filed: May 18, 2007

(65) Prior Publication Data

US 2007/0268253 A1 Nov. 22, 2007

(30) Foreign Application Priority Data

May 19, 2006 (TW) .............................. 95208638 U

(51) Int. Cl.
*G09G 5/08* (2006.01)
(52) U.S. Cl. .................... 345/158; 345/156; 345/163
(58) Field of Classification Search ......... 345/156–173; 455/569.1; 178/18.01–18.03
See application file for complete search history.

(56) References Cited

U.S. PATENT DOCUMENTS

| 6,515,654 | B1 * | 2/2003 | Liao | 345/173 |
| 6,784,870 | B2 * | 8/2004 | Yin | 345/156 |
| 7,154,486 | B2 * | 12/2006 | Wang et al. | 345/179 |
| 7,308,231 | B2 * | 12/2007 | Tung | 455/41.2 |
| 7,411,580 | B2 * | 8/2008 | Yanagi | 345/163 |
| 2002/0126094 | A1 * | 9/2002 | Junod et al. | 345/163 |
| 2003/0071783 | A1 * | 4/2003 | Chen | 345/156 |
| 2004/0164962 | A1 * | 8/2004 | Yin | 345/163 |
| 2006/0274043 | A1 * | 12/2006 | Lu | 345/163 |
| 2007/0132733 | A1 * | 6/2007 | Ram | 345/163 |
| 2008/0111792 | A1 * | 5/2008 | Roberts et al. | 345/163 |

* cited by examiner

*Primary Examiner*—Nitin Patel
(74) *Attorney, Agent, or Firm*—Stites & Harbison, PLLC; Juan Carlos A. Marquez, Esq.

(57) ABSTRACT

A wireless input module including a wireless input device and a signal receiver is provided. The wireless input device is formed with a cavity and the signal receiver is formed with an antenna part and a connector part for selectively connecting with an electronic apparatus. When the signal receiver is connected with the electronic apparatus, the wireless input device transmits a signal to the electronic apparatus through the antenna part and the connector part. When the signal receiver is not connected with the electronic apparatus, the connector part is received within the cavity and the antenna part is projected out of the wireless input device, so that the wireless input device and the signal receiver are integrated to exhibit a predetermined modeling shape.

10 Claims, 3 Drawing Sheets

WIRELESS INPUT MODULE WITH WIRELESS INPUT DEVICE AND RECEIVER

RELATED APPLICATION

This application claims the right of priority based on Taiwan Patent Application No. 095208638 entitled "WIRELESS INPUT MODULE WITH WIRELESS INPUT DEVICE AND RECEIVER", filed on May 19, 2006, which is incorporated herein by reference and assigned to the assignee herein.

TECHNICAL FIELD

The present invention relates to a wireless input module, and more particularly to a wireless input module having a wireless input device and a signal receiver integrated to exhibit a predetermined modeling shape.

BACKGROUND OF THE INVENTION

Conventionally, when a wireless input device, such as a wireless mouse, is in use, control signals are wirelessly sent to a computer through a signal receiver connected to the computer. When the wireless mouse is not in use, the signal receiver is usually disconnected from the computer and placed with the wireless mouse. Typically, the signal receiver is accommodated within the wireless mouse to improve the portability and convenience. FIG. 1 illustrates a conventional wireless input module 100 having a wireless mouse 110 and a signal receiver 120. As shown in FIG. 1, a space 112 is formed on the bottom surface of the wireless mouse 110 for accommodating the signal receiver 120 entirely.

Although the conventional wireless input module 100 having the signal receiver 120 allows users to accommodate the signal receiver 120 entirely within the wireless mouse 110, it becomes less satisfactory since the space 112 adversely restricts the size of the signal receiver 120. As a result, the effective range of receiving wireless signals is inevitably narrowed due to the restriction to the size of the signal receiver 120. Therefore, it would be desirable to provide an improved wireless input module to resolve the above-described problem.

SUMMARY OF THE INVENTION

One aspect of the invention is to provide a wireless input module having a wireless input device and a signal receiver. When the wireless input module is not in use, only a portion of the signal receiver is accommodated in the wireless input device, and the other portion of the signal receiver is projected out of the wireless input device. It is contemplated to place an antenna part of the signal receiver projected out of the wireless input device, such that the antenna part can be enhanced to improve the range of receiving wireless signal.

Another aspect of the present invention is to provide a wireless input module having a wireless input device and a signal receiver integrated to exhibit a predetermined modeling shape so that the external appearance of the wireless input module is more attractive and delightful.

In one embodiment, the present invention provides a wireless input module including a wireless input device having a cavity; and a signal receiver having an antenna part and a connector part for selectively connecting with an electronic apparatus. When the signal receiver is not connected with the electronic apparatus, the connector part is received within the cavity and the antenna part is projected out of the wireless input device, so that the wireless input device and the signal receiver are integrated to exhibit a predetermined modeling shape.

In one embodiment, the predetermined modeling shape includes a fish shape or a car shape. In an exemplary embodiment, the predetermined modeling shape can be a fish shape, and the antenna part is formed as a tail fin. In another exemplary embodiment, the predetermined modeling shape can be a car shape, and the antenna part is formed as an air diversion plate.

DETAILED DESCRIPTION OF THE PREFERRED EMBODIMENTS

Figure 1:
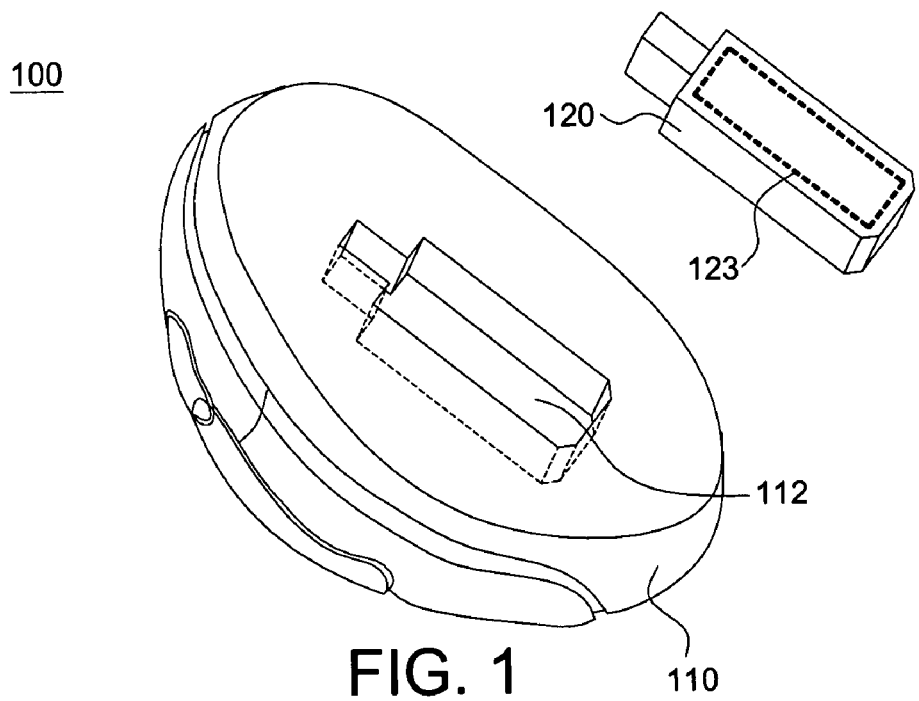
FIG. 1 is a diagram illustrating a conventional wireless input module.

The preferred embodiments of the present invention will now be described in greater details by referring to the drawings that accompany the present application. It should be noted that the features illustrated in the drawings are not necessarily drawn to scale. Descriptions of well-known components, materials, and process techniques are omitted so as not to unnecessarily obscure the embodiments of the invention.

Figure 2:
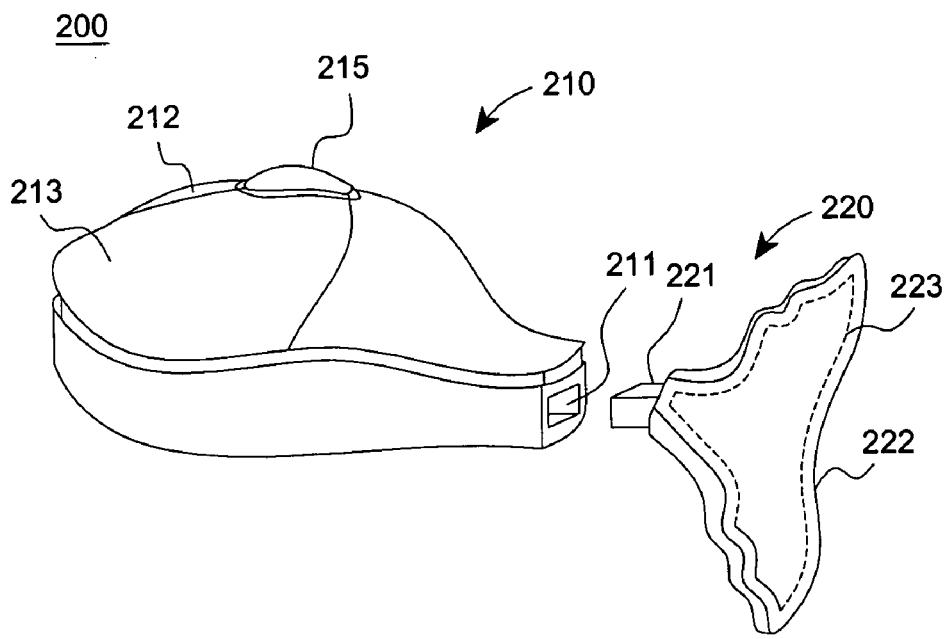
FIG. 2 is a diagram illustrating a wireless input module in accordance with a first embodiment of the present invention.
Figure 3:
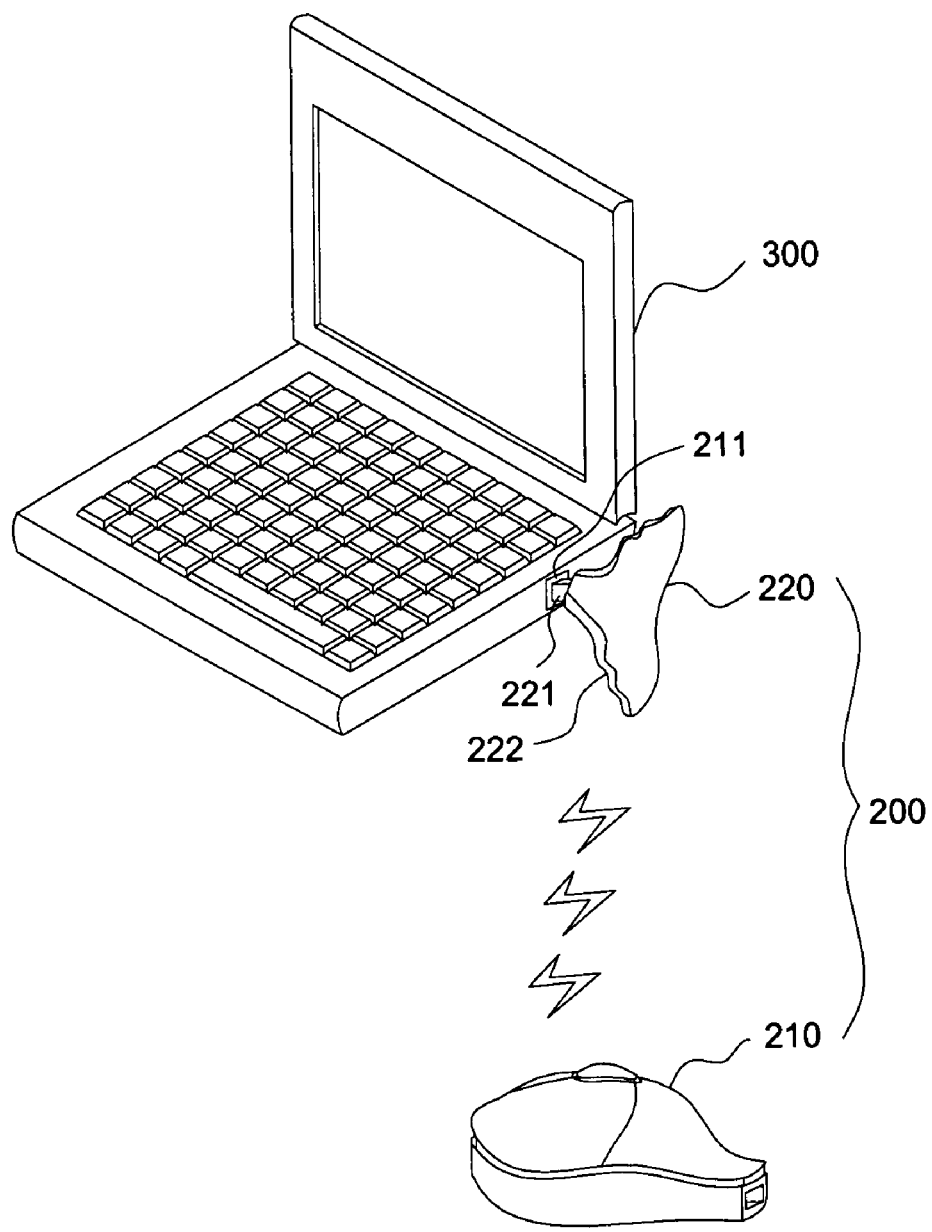
FIG. 3 is a diagram illustrating the wireless input module of the first embodiment in use.
Figure 4:
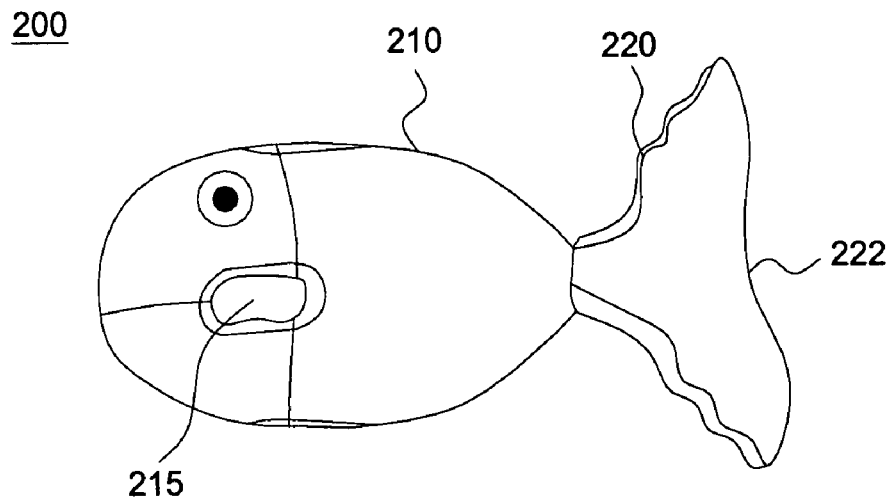
FIG. 4 is a diagram illustrating the wireless input module of the first embodiment not in use.

FIG. 2 to FIG. 4 illustrates a first embodiment of the present invention. As shown in FIG. 2, the wireless input module 200 includes a wireless input device 210 (e.g. a wireless mouse 210) and a signal receiver 220. It should be noted that the wireless mouse 210 shown in the embodiment is for illustration not limitation. The wireless input device 210 of the present invention may include any other suitable wireless electronic devices, such as wireless keyboards, remote controllers, etc.

As shown in FIG. 2, the wireless mouse 210 includes a cavity 211 disposed at a first end of the wireless mouse 210; a right key 212 and a left key 213 disposed on the top surface of the wireless mouse 210 and near a second end opposite to the first end; and a wheel 215 disposed on the top surface and between the right key 212 and the left key 213. The signal receiver 220 includes a connector part 221 and an antenna part 222. An antenna 223 for receiving signals from the wireless mouse 210 is arranged in the antenna part 222. Note that the contour of the antenna part 222 is variable and extendable, which is independent of the wireless mouse 210. As a result, the antenna 223 incorporated within the antenna part can be freely designed to meet the requirements of the desired signal receiving range. The connector part 221 is configured to selectively connect with an external electronic apparatus and to transfer signals from the wireless mouse 210 to the external electronic apparatus. The electronic apparatus may be a computer, a Personal Digital Assistant (PDA), or any other multimedia electronic apparatus. The connector part 221 is preferably a Universal Serial Bus (USB).

FIG. 3 shows the wireless input module 200 in use, in which a notebook 300 is illustrated as the electronic apparatus. As shown in FIG. 3, when the wireless input module 200 in use, the signal receiver 220 is connected with the notebook 300 by inserting the connector part 221 into the adaptor of the notebook 300. Accordingly, the wireless signals from the wireless mouse 210 will be received by the antenna 223 of the antenna part 222 first, and then sent to the notebook 300 through the connector part 221. As aforementioned, the signal receiving range depends upon the antenna part 222, which is extendable to meet the requirements of a satisfactory signal receiving range in accordance with the present invention. For example, the antenna part 222 can be appropriately extended so that the signal receiving range may cover a large conference room entirely. Preferably, the wireless mouse 210 may further include a laser pointer (not shown). During a presentation, a lecturer holds the wireless mouse 210 can easily walk around the conference room and simultaneously controls the notebook 300 to select and point out the items of interest on the screen without worrying about the communication between the wireless mouse 210 and the signal receiver 220 connected to the notebook 300.

FIG. 4 illustrates the wireless input module 200 not in use. As shown in FIG. 4, when the connector part 221 is not connected to the external electronic apparatus, the connector part 221 is inserted into the cavity 211 shown in FIG. 2, so that the signal receiver 220 is fixed on the wireless mouse 210, and the antenna part 222 is projected out of the wireless input device 210. Preferably, as shown in FIG. 2, the size and the shape of the cavity 211 are formed to be substantially the same as those of the connector part 221. Therefore, the connector part 221 can engage with the cavity 221 well so that the signal receiver 220 is stably fixed to the wireless mouse 210. Note that the shape of the antenna part 222 is variable and independent of the size or shape of the cavity 211. The volume of the antenna part 222 is preferably larger than the volume of the connector part 221 (i.e. the volume of the cavity 211).

In addition to providing the wireless input module 200 having the antenna part 222 with a shape not restricted by the wireless mouse 210, the present invention also provides a design concept to enhance the external appearance of the wireless input device 210 in combination with the signal receiver 220. As shown in FIG. 4, the wireless input device 210 and the signal receiver 220 are integrated to exhibit a predetermined modeling shape, such as a fish shape. In this embodiment, the antenna part 220 is formed as a tail fin of the fish shape, and the wheel 215 is disposed on the gill of the fish shape.

Figure 5:
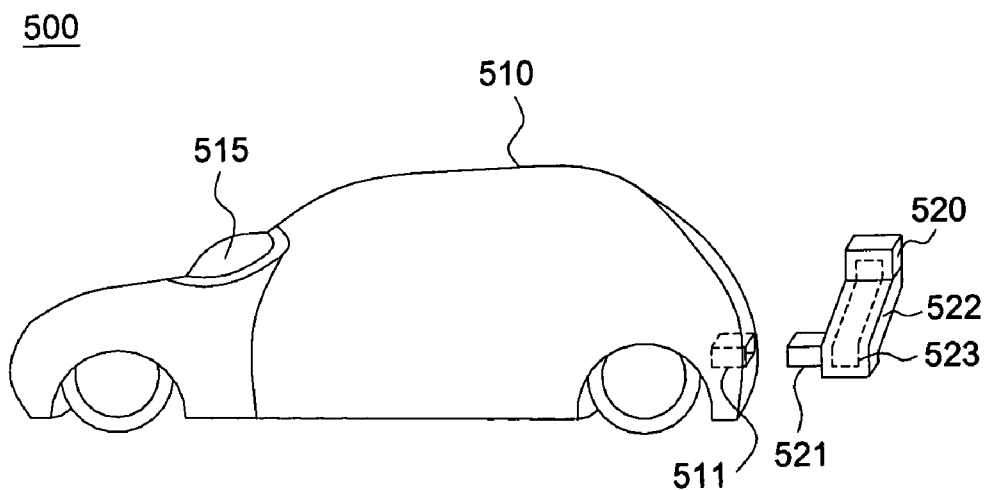
FIG. 5 is a diagram illustrating a wireless input module in accordance with a second embodiment of the present invention.

FIG. 5 illustrates a wireless input module 500 in accordance with a second embodiment of the present invention. As shown in FIG. 5, the wireless input module 500 includes a wireless mouse 510 and a signal receiver 520. The wireless mouse 510 includes a cavity 511 disposed at an end of the wireless mouse 510; and a wheel 515 disposed on the top surface of the wireless mouse 510. The signal receiver 520 includes a connector part 521 and an antenna part 522. An antenna 523 for receiving signals from the wireless mouse 510 is arranged in the antenna part 522. The connector part 521 is configured to selectively connect with an electronic apparatus and transfer signals from the wireless mouse 510 to the electronic apparatus. The electronic apparatus may be a computer, a Personal Digital Assistant (PDA), or any other multimedia electronic apparatus. When the wireless input module 500 is either in use or not in use, the manipulations for the wireless input module 500 are similar to the wireless input module 200 of the first embodiment. Specifically, when the wireless input module 500 is in use, the wireless mouse 510 can transmit a wireless signal to the electronic apparatus through the antenna part 522 and the connector part 521 connected with the electronic apparatus. When the wireless input module 500 is not in use, the connector part 521 is inserted into the cavity 511 so that the signal receiver 220 is fixed to the wireless mouse 510 with the antenna part 522 projected out of the wireless input device 510. Likewise, the shape of the antenna part 522 is variable and independent of the size or shape of the cavity 511. Besides, as shown in FIG. 5, the wireless input device 510 and the signal receiver 520 are integrated to exhibit a car shape. In such an arrangement, the antenna part 522 is formed as an air diversion plate of the car shape, and the wheel 515 is disposed on a hood of the car shape.

Note that the present invention does not intend to restrict the antenna part by predeterminedly setting up the shape of the wireless input module. In accordance with the present invention, the designer may determine the criterions of the antenna part with respect to the desired signal receiving range and then subsequently deliberate the entire shape of the wireless input module to make the external appearance more attractive and delightful.

The detailed description of the above preferable embodiments is to describe the technical features and spirit of the present invention, and the disclosed preferable embodiments are not intended to limit the scope of the present invention. On the contrary, the preferable embodiments and its variations or equivalents all fall within the scope of the present invention. Therefore, the scope of the present invention should be most broadly explained according to the foregoing description and includes all possible variations and equivalents.

I claim:

1. A wireless input module, comprising:
   a wireless input device having a cavity; and
   a signal receiver having an antenna part and a connector part for selectively connecting with an electronic apparatus,
   wherein when the signal receiver is not connected with the electronic apparatus, the connector part is received within the cavity and the antenna part is projected out of the wireless input device, so that the wireless input device and the signal receiver are integrated to exhibit a predetermined modeling shape.

2. The wireless input module according to claim 1, wherein the volume of the antenna part is larger than the volume of the connector part.

3. The wireless input module according to claim 1, wherein the cavity is made to fit the connector part.

4. The wireless input module according to claim 1, wherein the cavity is disposed at an end of the wireless input device.

5. The wireless input module according to claim 1, wherein when the signal receiver is connected with the electronic apparatus, the wireless input device transmits a wireless signal to the electronic apparatus through the antenna part and the connector part.

6. The wireless input module according to claim 1, the connector part comprises a universal serial bus (USB).

7. The wireless input module according to claim 1, wherein the predetermined modeling shape comprises a fish shape, and the antenna part is formed as a tail fin.

8. The wireless input module according to claim 7, wherein the wireless input device further comprises a wheel disposed on a gill of the fish shape.

9. The wireless input module according to claim 1, wherein the predetermined modeling shape comprises a car shape, and the antenna part is formed as an air diversion plate.

10. The wireless input module according to claim 9, wherein the wireless input device further comprises a wheel disposed on a hood of the car shape.

* * * * *